3,303,157
SILYLATED POLYAMIDE-ACIDS AND
COMPOSITIONS THEREOF
Edith M. Boldebuck and Johann F. Klebe, both of Schenectady, N.Y., assignors to General Electric Company, a corporation of New York
Filed Apr. 15, 1964, Ser. No. 359,928
15 Claims. (Cl. 260—30.4)

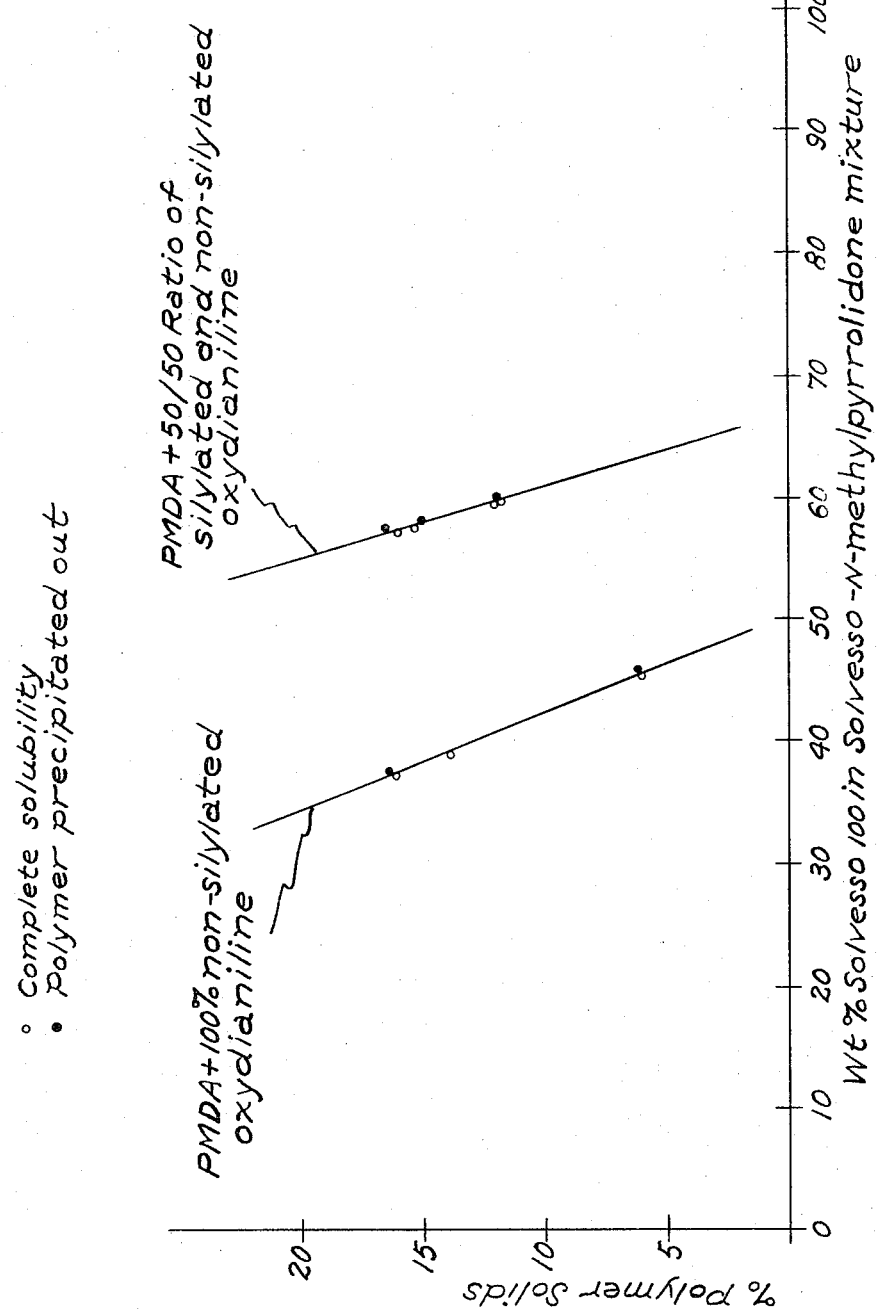

This invention is concerned with novel polyimide precursors convertible to polyimide resins, and a process for making such precursors and polyimide resins. More particularly, the invention is concerned with a process for making both solid and liquid intermediate organosilylated polyamide resins, which, upon heating, are convertible to polyimide resins having the recurring unit (I)

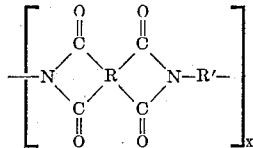

which process comprises effecting reaction of a mixture of ingredients comprising (1) a triorganosilyl amine of the formula (II)

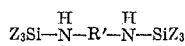

(2) at least one tetracarboxylic acid dianhydride (hereinafter referred to as "dianhydride") having the structural formula (III)

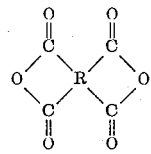

and (3) a solvent non-reactive toward functional groups of (1) and (2), where $x$ is a whole number in excess of 1, e.g., 10 to 100,000 or more, Z is a monovalent hydrocarbon radical, R is a tetravalent rarical containing at least 6 carbon atoms in a ring having benzenoid unsaturation, the 4 carbonyl groups of said dianhydride being attached to separate carbon atoms of said tetravalent radical in the ring, and each pair of carbonyl groups being attached to adjacent carbon atoms in the R radical or at most removed by one carbon atom, and R' is a divalent aromatic radical of at least 6 carbon atoms. Thereafter, the reaction mixture in the same solvent containing the silylated polyamide acid resin of the formula (IV)

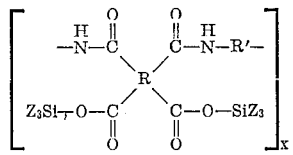

(where $x$, Z, R and R' have the meanings given above) can be heated at elevated temperathres to effect removal of the triorganosilyl ($Z_3Si$—) radicals and of the solvent to give the polyimide resin of Formula I.

In British Patent 903,271, the complete specification of which was published August 15, 1962, and in Australian Patent 58,424 is described the preparation of polyimide resins having the Formula I (where R' in being a divalent aromatic radical, can be for instance, a benzenoid radical of the formula

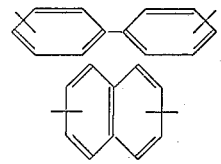

or

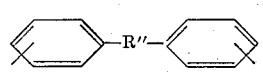

in which R" is carbon, oxygen, silicon or sulfur), said polyimide resin having a viscosity of at least 0.1 as measured at 30° C. in a solution of 0.5 percent, by weight, of the polyimide in sulfuric acid.

The polyimides prepared in the aforesaid British and Australian patents are obtained by effecting reaction between a diamine having the structural formula (V)     $H_2N$—R'—$NH_2$ wherein R' is a divalent aromatic radical containing at least 6 carbon atoms, the two amino groups of said diamine each being attached to separate carbon atoms of said divalent radical, with at least one tetracarboxylic acid dianhydride having the structural Formula of III where R has the meaning given above. Since primary diamines are employed for making these resins, the first reaction which goes at relatively lower temperatures, is carried out to give a polyamide acid resin composed of recurring units of the formula

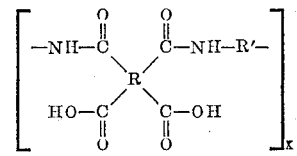

where $x$, R, and R' have the meanings given above. Upon further heating, the latter polymer is converted to the polyimide structure of Formula I.

The reaction of first making the above polyamide acid resin is carried out in an organic polar solvent which is inert to the system and which generally has adequate solvating power to maintain the polyamide acid polymer in solution. Because of the relative insolubility of the polyamide acid resin, when the latter is made in the manner described in the above-mentioned British and Australian patents, only a relatively limited class of solvents has been found effective for the purpose. Coincidentally, in addition to being quite expensive and in addition to some being quite pungent in odor (e.g., pyridine), these solvents generally have fairly high boiling points, and for the most part have boiling points in excess of 125° C. and some as high as 200° C., or even higher. When lower boiling inert solvents are employed, and using the above reactants, it is found that in addition to one or both of the reactants often being insoluble in these lower boiling solvents, the polyamide acid resin often precipitates prematurely from the solution thereby hindering the use of solutions of the polyamide acid in coating and insulating applications, in film-forming and fiber-forming operations, and in any other application where a solution of the resin would be desirable. Thus, in those instances where a solution of the polyamide acid resin is required to be applied to a surface, whether it be for coating (such as in insulation) or for film-forming purposes, the removal of the solvent (particularly expensive and high boiling solvents such as N-methyl-2-pyrrolidone, which will hereinafter be referred to as "NMP," N,N-dimethylacetamide, etc.) requires excessively high temperatures, well above 150° C. and usually in the range of between 175–250° C.

As a still further problem in making polyimide resins in the fashion of the British and Australian patents, any attempt to reduce the cost of these high boiling solvents by dilution (during the production of the polyamide acid resin) with less expensive solvents, such as aromatic hydrocarbon solvents, for instance, benzene, toluene, xylene, mixtures of alkylated benzenes, etc., either results in precipitation of the polyamide acid resin from the high boiling solvent (because of the lack of solvating action of these lower boiling solvents), or else requires so much of the higher boiling, more expensive solvent as to make such dilution still economically unattractive. Moreover, because of the excessive amounts of the higher boiling solvent required, the problem of ready and complete volatilization of solvent in making films by casting, or fibers by dry-spinning is still substantially unsolved.

We have unexpectedly discovered that by using silylated diamines of Formula II instead of the unsilylated diamines of Formula V, we can employ solvents having much lower boiling points for making the aforesaid silylated polyamide acid resins, and that by employing these lower boiling solvents, we are able to avoid the problem of either the insolubility of the polyamide acid resin, or the necessity for using excessive temperatures to remove the solvent after application of the resin solution to surfaces. We have further discovered that by using these silylated diamines, we can dilute the more expensive higher boiling solvents mentioned above to a greater extent with larger amounts of less expensive and lower boiling solvents such as the aforementioned aromatic hydrocarbons, tetrahydrofuran, dioxane, etc., so as to reduce still further the cost of making these polyimide resins without adversely affecting the properties of the intermediate polyamide acid resin or of the polyimide resin.

Taking pyromellitic dianhydride and the disilylated derivative of p,p'-diaminodiphenyl ether as examples of reactants to make the polyamide acid resin, it is believed that the reaction proceeds in accordance with the following unbalanced equation using the lower boiling solvents (or mixtures of such solvents with the higher boiling, more expensive solvents) found effective in our invention:

It will be noted that first the poyamide acid resin is formed with the triorganosilyl groups on the carboxylic acid group, and by the application of heat, the polyimide formation occurs, with the formation of the triorganosilanol, which ordinarily will condense to form hexamethyldisiloxane. In the above equation, $x$ has the meaning given above and $n$ is to indicate the equivalent molar relationship of the reactants. Both the solvents and many of the triorganosilanols are sufficiently low boiling to be readily volatilized.

The disilylated diamino aryl compounds of the formula

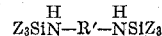

(where Z and R' have the meaning given above) are more particularly disclosed and methods of making the same described in U.S. 3,172,874—Klebe, issued March 9, 1965 and assigned to the same assignee as the present invention. Among the radicals which Z may be are, for instance, alkyl radicals (e.g., methyl, ethyl, propyl, isopropyl, pentyl, octyl, dodecyl, etc., radicals); aryl radicals (e.g., phenyl, naphthyl, biphenyl, etc., radicals); aralkyl radicals (e.g., benzyl, phenylethyl, etc., radicals); alkaryl radicals (e.g., xylyl, tolyl, ethylphenyl, methylnaphthyl, etc., radicals); cycloaliphatic (including unsaturated) radicals (e.g., cyclopentyl, cyclohexyl, cyclopentenyl, cyclohexenyl, etc., radicals); unsaturated acyclic aliphatic radicals (e.g., vinyl, allyl, methallyl, etc., radicals); etc. Among the divalent aryl radicals which R may be are for instance, phenylene, xenyl, diphenylene oxide, diphenylene sulfide, diphenylene alkanes of the formula

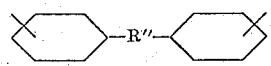

where R'' is a divalent alkyl radical, for example, methylene, isopropylidene, trimethylene, etc., and the valences other than those attaching the R'' group to the phenylene nucleus are situated ortho, meta, or para.

The triorganosilyl diamines of Formula II can be prepared by reacting a diamine of Formula V with a triorganohydrolyzable silane of the formula

where Z has the meaning given above, and X is a halogen, for example, chlorine, bromine, fluorine, etc. Among the triorganohydrolyzable silanes which may be employed are, for instance, trimethylchlorosilane, triphenylbromosilane, methyldiethylbromosilane, triphenylchlorosilane, tritolylbromosilane, triethylchlorosilane, tribenzylchlorosilane, etc.

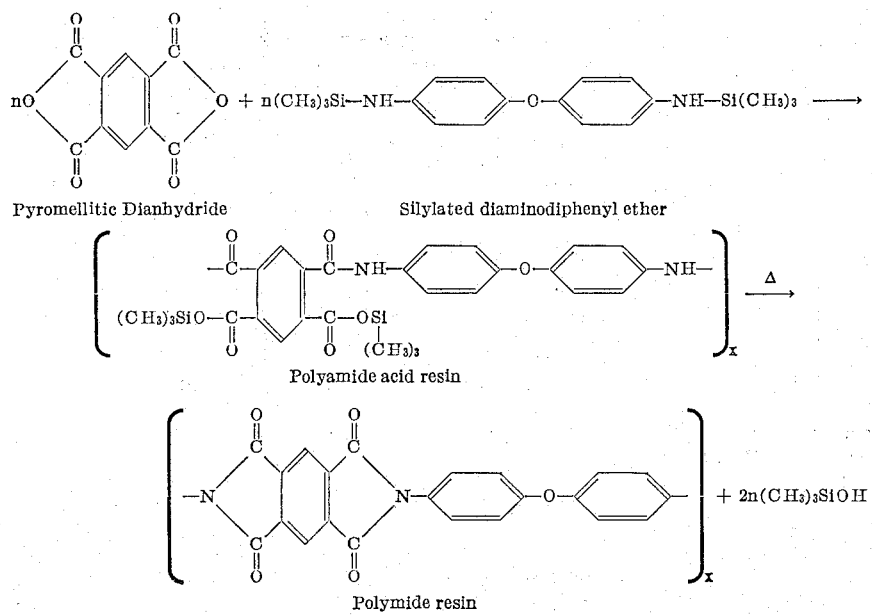

Pyromellitic Dianhydride    Silylated diaminodiphenyl ether

Polyamide acid resin

Polymide resin

Among the diamino compounds of Formula V which may be used to make the triorganosilyl diamines of Formula II are, for instance, m-phenylenediamine, p-phenylenediamine, toluenediamine (where the diamino groups may be ortho, meta, or para); 4,4'-diaminodiphenyl; 4,4'-diaminodiphenyl oxide; 2,2'-diaminodiphenylmethane, 4,4'-diaminodiphenylsulfide; 2,2-bis(4,4'-diaminodiphenyl) propane; 3,3-dichlorobenzidine; 3,3'-diaminodiphenyl sulfone; 4,4'-diaminodiphenyl sulfone; 1,5-diamino naphthalene; 3,3'-dimethyl-4,4'-biphenyl diamine; 3,3'-dimethoxy benzidine; bis-para-(1,1-dimethyl-5-amino-pentyl) benzene; 2,4-diaminoisopropyl benzene; m-xylylene diamine; p-xylylene diamine; etc.

In making the triorganosilyl amines of Formula II a molar ratio of at least 2 and up to 6 or more mols of the trihydrocarbon substituted hydrolyzable silane of formula $Z_3SiX$ is reacted with 1 mol of the diamino composition of Formula V, preferably in the presence of a non-polar solvent such as benzene, toluene, xylene, dioxane, etc., under anhydrous conditions at temperatures from slightly above room temperature up to the reflux temperature of the mass, e.g., about 125° C. The triorganohydrolyzable silane, such as trimethylchlorosilane, when added to the diamino compound, in the presence of a hydrohalide acceptor such as, pyridine, triethylamine, etc., or some other tertiary amine usually results in an exothermic reaction with the temperature rising to as high as 40–70° C. The mixture of ingredients is advantageously stirred for a period of from about one half to two hours and thereafter heated at the reflux temperature of the mass for an additional period of 15 minutes to 1 hour and the hydrohalide of the hydrohalide acceptor is then filtered off and the reaction product fractionally distilled to isolate the desired tridrganosilyl amine of Formula II.

The tetracarboxylic acid dianhydrides useful in this invention are characterized by the following formula:

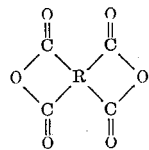

wherein R is a tetravalent radical, e.g., a radical derived from or containing an aromatic group containing at least 6 carbon atoms characterized by benzenoid unsaturation, wherein each of the 4 carbonyl groups of the dianhydride are attached to a separate carbon atom in the tetravalent radical, the carbonyl groups being in pairs in which the groups in each pair are attached to adjacent carbon atoms of the R radical or to carbon atoms in the R radical at most one carbon atom removed, to provide a 5-membered or 6-membered ring as follows:

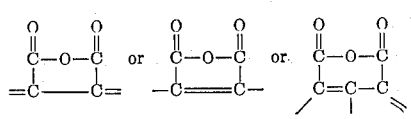

Illustrations of dianhydrides suitable for use in the present invention (with their future designation in parentheses) include: pyromellitic dianhydride (PMDA); 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl)propane dianhydride; bis(3,4-dicarboxyphenyl)sulfone dianhydride; benzophenone tetracarboxylic acid dianhydride (BPDA); perylene-1,2,7,8-tetracarboxylic acid dianhydride; bis(3,4-dicarboxyphenyl) ether dianhydride; bis(3,4-dicarboxyphenyl)methane dianhydride; perylene-3,4,9,10-tetracarboxylic acid dianhydride of the formula

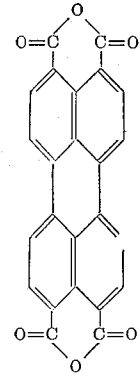

1,8,4,5-naphthalene tetracarboxylic dianhydride of the formula

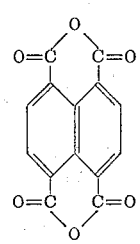

etc.

Among the solvents which can be employed in making the silylated polyamide acid resin which have boiling points generally below 150° C. when measured at atmospheric pressure, and are readily available and inexpensive, may be mentioned, for instance, dioxane, tetrahydrofuran, tetrahydropyran, etc. Generally the solvents useful for making the silylated polyamide resin are those whose functional groups (if they have any) do not react with either of the reactants. Beside being inert to the system and also being a solvent for the silylated polyamide acid resin, the solvent must be a solvent for at least one of the reactants, preferably for both. Thus, in addition to the use of the above compositions as sole solvents, other solvents boiling above 150° C. may be additionally used concurrently, for example, N,N-dimethylformamide, N,N-dimethylacetamide, N,N-diethylformamide, N,N-diethylacetamide, N,N-dimethylmethoxy acetamide, N-methyl caprolactam, dimethylsulfoxide, N-methyl-2-pyrrolidone (NMP), tetramethylene urea, pyridine, dimethylsulfone, hexamethylphosphoramide, tetramethylene sulfone, formamide, N-methylformamide and N-acetyl-2-pyrrolidone.

In order to reduce the cost of the higher boiling solvents, one can dilute the latter with solvents which are usually poor solvating agents for either one or both of the reactants, or the silylated polyamide acid resin. Among such diluent solvents may be mentioned, for example, benzene, benzonitrile, acetonitrile, butyrolactone, xylene, toluene, cyclohexane, mixtures of alkylated benzenes (e.g., xylenes, mesitylenes, durenes, etc.) such as the Solvessos sold by Esso Company, etc. By using the silylated diamine with the dianhydride, one can introduce larger amounts of these poorer solvents into the solvent system than is possible when one employs the nonsilylated diamine for reaction with the dianhydride. Generally, on a weight basis, in our invention, we can use from 10 to as high as 60 weight percent or more of the poorer solvents with the more conventional higher boiling solvents recited in the aforesaid British and Australian patents.

The reaction between the dianhydride and the silylated diamine to make the silylated polyamide acid resin is advantageously carried out under substantially anhydrous conditions (and this applies particularly to using moisture-free solvents) while maintaining the temperature throughout the reaction from room temperature (about 25° C.)

to at most 60° C. Higher temperatures are usually unnecessary since mere room temperature mixing of the ingredients in the proper solvent effects the necessary addition reaction.

In general, the preferred process involves premixing equimolar amounts of the silylated diamine and the dianhydride and adding the solvent with agitation. Alternatively, it is possible also to dissolve the silylated diamine in the solvent and while effecting suitable stirring, to add the dianhydride thereby effecting control of the reaction temperature. The stirring of the reaction mixing after completion of the addition of all the reactants and solvent is maintained until the maximum viscosity (denoting maximum polymerization) of the silylated polyamide acid is obtained. If substantially more than equimolar concentrations of the reactants under the above-described conditions are used, it will be found that the degree of polymerization will be substantially hampered and lower molecular weight products (of lower intrinsic viscosity) will be obtained. Generally, one can employ up to about 10 percent molar excess of either reactant without encountering serious difficulty. In some cases it may be desirable to use larger molar excesses of either of the silylated diamine or the dianhydride. By the above process, it is possible to obtain polymers of intrinsic viscosity in tetrahydrofuran of from 0.1 to 5 dl./g. or more and molecular weights of the silylated polyamide acid resin ranging from about 1,000 to 500,000 or more. Any end groups present in the silylated polyamide acid resin would be anhydride groups or —SiZ$_3$ groups where Z has the meaning above.

The quantity of organic solvent used in preparing the silylated polyamide acid resin is that required to dissolve the silylated diamine and to provide sufficient solvent so that the ultimate silylated polyamide acid resin is completely dissolved and forms with the solvent a product of adequate viscosity. Also the amount of solvent used should be sufficient that when used for the intended application such as, coating applications for film-forming purposes, for fiber extrusion, etc., an appropriate viscosity is obtained. Generally, the solvents should be maintained and used in such a concentration that the solids content of the formed silylated polyamide acid resin in the solution ranges from about 5 to 35 weight percent, based on the total weight of the solvent and the silylated polyamide acid resin. For this purpose we have found that in making the silylated polyamide acid resin, amounts of the solvent (or mixture of solvents) can be used such that they represent from about 65 to 95 weight percent or more of the total weight of the solvent and the expected silylated polyamide acid resin.

After formation of the solution of the silylated polyamide acid, it is only necessary to heat the latter at temperatures of from about 150–300° C. to effect conversion to the polyimide form of the resin having the recurring unit as defined in Formula I. As the polyimide resin forms, triorganosilanols are released from the silylated polyamide acid resin and generally these will in turn from a hexaorganodisiloxane. Because of the low boiling point of many of these hexaorganodisiloxanes, little difficulty will be encountered in volatilizing the latter disiloxanes at the temperatures at which the solvent is removed and the polyimide resin is formed.

One of the advantages of our process for making polyimide resins is that it does not require any of the usual additives such as, acetic anhydride-pyridine mixtures, carbodiimides, for example, dicyclohexylcarbodiimide, etc. The mere application of heat is sufficient to effect the change from the silylated polyamide acid resin state to the polyimide resin state.

In order that those skilled in the art may better understand how the present invention may be practiced, the following examples are given by way of illustration and not by way of limitation. All parts are by weight unless otherwise indicated. In all instances, in making the silylated or non-silylated polyamide acid resins, anhydrous conditions and anhydrous and purified reactants and solvents were employed. The silylated diamines used in the following examples were prepared as follows:

*Preparation of N,N'-bis(trimethylsilyl)-p,p'-diaminodiphenyl ether*

The compound N,N'-bis(trimethylsilyl)-p,p'-diaminodiphenyl ether having the formula

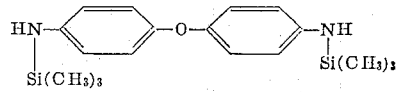

was prepared by suspending 164 grams of p,p'-diaminodiphenyl ether in a mixture of 1.5 liters of dry benzene and 250 grams of triethyl amine (as the hydrohalide acceptor). While agitating the mixture, 180 grams of trimethylchlorosilane was added under anhydrous conditions. The temperature of the mixture rose to about 60° C. upon addition of the chlorosilane. After 2 hours of stirring, the mixture was heated at the reflux temperature of the mass for an additional hour, the triethylamine hydrochloride formed was filtered off, and the filtrate fractionally distilled to yield the above silylamine diphenyl ether boiling at 196–197° C./1.4 mm. pressure; on recrystallization from dry n-hexane, the compound melted at 72–73° C. Analysis showed it to be the desired compound as evidenced by the following analyses.

Found: C, 63.0%; H, 8.0%; N, 8.0%; Si, 16.3%. Theoretical: C, 62.7%; H, 8.2%; N, 8.1%; Si, 16.3%. This compound will hereinafter be identified as "silylated oxydianiline."

*Preparation of N,N'-bis(trimethylsilyl)-m-phenylene diamine*

N,N'-bis(trimethylsilyl)-m-phenylenediamine was prepared by dissolving 108 grams (1 mol) m-phenylenediamine and 300 grams of triethylamine (as a hydrohalide acceptor) in 1 liter of dry toluene, and the mixture of ingredients was heated to the reflux temperature of the mass. While at this temperature and under anhydrous conditions, 230 grams (2.10 mols) trimethylchlorosilane was added slowly over a period of about 30 minutes and the mixture then heated at its reflux temperature for about 2 additional hours. The precipitated triethylamine hydrochloride was removed by filtration and the product fractionally distilled to give a silylated amine having the formula

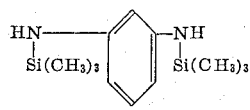

boiling at 130° C./3.5 mm. and having a refractive index $n_D^{20.5}=1.5266$. This compound will hereinafter be referred to as "silylated-m-phenylenediamine."

*Preparation of N,N'-bis(trimethylsilyl)-p-phenylenediamine*

The compound N,N'-bis(trimethylsilyl)-p-phenylenediamine of the formula

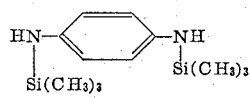

was prepared similarly as was done in making the silylated m-phenylenediamine, with the exception that an equivalent amount of para-phenylenediamine was substituted for the meta-phenylenediamine. The desired diamine, when recrystallized from dry n-hexane had a melting point of 103–105° C., and showed the following analyses, the values in parentheses being the theoretical values: percent C: 57.3 (57.1); percent H: 9.7 (9.6); percent N: 11.1 (11.1); percent Si: 22.2 (22.3). This compound will hereinafter be referred to as "silylated-p-phenylenediamine."

*Preparation of N,N'-bis(trimethylsilyl)-p,p'-diaminodiphenylmethane*

The compound N,N'-bis(trimethylsilyl)-p,p'-diaminodiphenylmethane is prepared similarly as was done for making the silylated oxydianiline above except that the diaminodiphenyl ether is replaced with 196 grams p,p'-diaminodiphenylmethane and 220 grams rather than 180 grams of trimethylchlorosilane is employed. The product isolated as a result of carrying out the reaction melts at 52–54° C., and has the formula

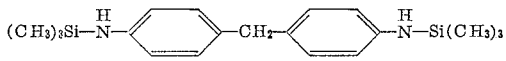

as evidenced by the analyses; percent C: 66.5 (66.3); percent H: 8.9 (8.9); percent N: 8.5 (8.3); percent Si: 16.8 (16.6). This compound will hereinafter be referred to as "silylated methylene dianiline."

EXAMPLE 1

A solution was formed of 7.18 parts PMDA, 11.48 parts of the silylated oxydianiline, and 105.7 parts tetrahydrofuran. Upon stirring the reaction mixture at room temperature for about 10 minutes there was obtained a completely homogeneous solution of about a 15% weight solids content of a silylated polyamide acid resin composed of recurring units of the formula

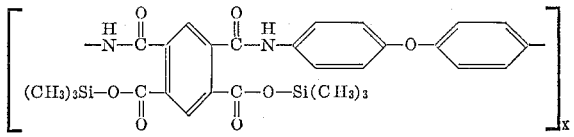

where $x$ has the meaning previously given. Fibers could be readily drawn from this solution. If the fiber drawing was carried out in a dry atmosphere, the tetrahydrofuran solvent evaporated rapidly at room temperature to give clear threads which could be stretched and which then showed high transmission of polarized light indicating a high degree of orientation. If the solvent was allowed to evaporate from the drawn fiber in the presence of ambient (moisture-containing) air, an opaque, strong filament was obtained which could also be stretched to an oriented polymer. When the above solution of the silylated polyamide acid was applied to a base surface and the solvent allowed to evaporate in an atmosphere of dry nitrogen, thin films of a silylated polyamide acid resin were obtained. When these films were heated for 130 minutes at 150° C., they were converted to a completely unsilylated polyimide resin structure, which showed no difference in properties from the same polyimide resin structure derived from an unsilylated polyamide acid resin.

EXAMPLE 2

When Example 1 was repeated except that an equimolar amount of non-silylated oxydianiline was substituted for the silylated oxydianiline with the PMDA and using the tetrahydrofuran as the sole solvent, an insoluble mixture was obtained showing no evidence of resin formation, thus indicating the necessity for using the silylated oxydianiline for reaction with the PMDA when using tetrahydrofuran as the sole solvent. To obtain adequate solution of the reactants and the formation of a clear solution of the polyamide acid resin, at least 30 weight percent of the tetrahydrofuran had to be substituted with N-methyl pyrrolidone (NMP).

EXAMPLE 3

In this example, 24.87 parts PMDA and 28.6 parts of the silylated m-phenylenediamine were reacted in 302.8 parts tetrahydrofuran similarly as was done in Example 1, to give a clear solution in the tetrahydrofuran of a silylated polyamide acid resin composed of recurring units of the formula

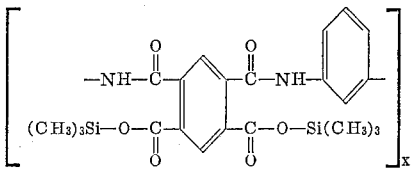

in a 15% weight solids content, where $x$ has the meaning previously assigned. Heating surfaces coated with this solution at temperatures of 150°–200° C. for times of several minutes to 1 hour gave the expected polyimide resin of Formula I.

EXAMPLE 4

In this example, a solution of 25.9 parts BPDA, 27.5 parts silylated oxydianiline, and 303.6 parts tetrahydrofuran were stirred at room temperature for about 50 minutes to yield a silylated polyamide acid resin (in about a 15 weight percent solids content) composed of recurring units of the formula

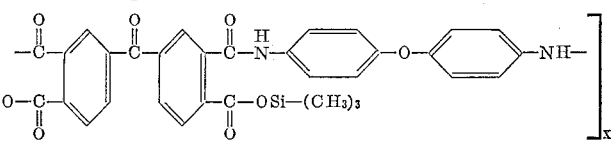

where $x$ has the meaning given above. Casting of the tetrahydrofuran solution of this silylated polyamide acid resin on a surface and thereafter heating at a temperature of about 150° C. for about 15 minutes gave a polyimide resin based on the use of the BPDA moiety.

The following examples illustrate the ability to use larger amounts of less expensive, poor solvents (i.e., materials which have little or no solvating action for the reactants of the reaction product), with the more expensive better solvents of higher boiling point as a result of using a silylated diamine with the dianhydride.

EXAMPLE 5

About 5.01 parts PMDA and 4.61 parts p,p'-diaminodiphenyl ether were mixed with 70.52 parts toluene to make a mixture containing about 12% solids. Essentially no reaction was observed when the mixture was stirred at room temperature for about 30 minutes. In order to obtain complete solution of the reactants and complete reaction to form a polyamide acid resin of 7.8% solids content, it was necessary to add NMP (N-2-methylpyrrolidone) in an amount sufficient to give a weight ratio of the toluene and the NMP of 62/38.

EXAMPLE 6

When Example 5 was repeated but instead equimolar concentrations composed of 11.94 parts of the silylated oxydianine (was used in place of the non-silylated oxydianiline) together with 7.53 parts PMDA were employed, it was found possible to obtain a homogeneous solution and an equivalent silylated polyamide acid resin (7.8 weight percent solids) by employing 185.6 parts toluene and 45.2 parts NMP in a weight ratio of the toluene to the NMP of 81/19, thus establishing that it was possible to use more toluene with the NMP by using the silylated oxydianiline than was possible when the non-silylated oxydianiline was employed.

EXAMPLE 7

In this example, equivalent molar concentrations of m-phenylenediamine and PMDA were reacted in the same manner as was done in Example 5, employing the combination of toluene and NMP as the solvent for the reaction.

As a result of using the non-silylated m-phenylenediamine, it was found necessary to use a weight ratio of the toluene to the NMP of 46/54 for a solids content of 5.9%. However, when an equivalent amount of the silylated m-phenylenediamine was employed in its place, it was found possible to use the toluene and NMP in a weight ratio of 93/7.

EXAMPLE 8

Equimolar amounts of BPDA and of the silylated m-phenylenediamine were readily dissolved in a mixture of toluene and NMP in a weight ratio of 84/16. After reaction similarly as in Example 5, a silylated polyamide acid resin composed or recurring units of the formula

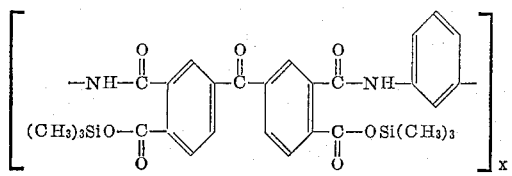

where $x$ has the meaning given above was obtained which was fully miscible in the solvent mixture to a solids content of 10 weight percent. When the non-silylated m-phenylenediamine was used in place of the silylated diamine, the amount of toluene which could be used with the NMP was at most 60 weight percent of the two solvents to obtain a homogeneous solution of the polyamide acid resin to the same solids content.

EXAMPLE 9

When equimolar amounts of the silylated p-phenylenediamine and PMDA were dissolved in a solvent mixture of toluene and NMP, it was found that complete solution and formation of a homogeneous solution of the silylated polyamide acid resin was obtained at a weight ratio of 81/19 of the toluene and the NMP at a solids content of about 8.7 weight percent. When the non-silylated p-phenylenediamine was employed instead of the silylated diamine, it was found that the weight ratio of the toluene to NMP was 60/40 indicating the necessity of using considerably more of the NMP to obtain a suitable solution of the reactants and the polyimide acid resin.

EXAMPLE 10

In this example, equimolar proportions of BPDA and the silylated p-phenylenediamine dissolved readily in a solution of toluene and NMP when the weight ratio was 85/15. After stirring the reactants into the solvent, a homogeneous solution of a polymeric silylated polyamide acid resin (having recurring units the same as in Example 8 except the p-phenylenediamine moiety is substituted for the m-phenylenediamine moiety of Example 8) was obtained of about 9.3 percent solids content. When an equivalent amount of the non-silylated p-phenylenediamine was employed in place of the silylated diamine, and otherwise the conditions were the same, it was found that the amount of NMP required to obtain equivalent solutions was such that the NMP composed about 40% of the total weight of the two solutions for equivalent solids content.

EXAMPLE 11

When an attempt was made to dissolve m-phenylenediamine and PMDA in equimolar proportions in tetrahydrofuran, it was found that before adequate solution of the reactants could take place and a clear homogeneous solution of the resin formed pursuant to Example 5, it was necessary to add the NMP in such an amount that the weight ratio of the tetrahydrofuran to the NMP was 56/44 (to give a polyamide acid resin of 9.4 percent solids). This result should be compared with Example 3, where the tetrahydrofuran was used successfully as the sole solvent where the silylated m-phenylenediamine was employed.

EXAMPLE 12

When silylated p-phenylenediamine was mixed with PMDA in equimolar proportions in a mixture of NMP and tetrahydrofuran, it was found that adequate solution of the reactants and formation of the silylated polyamide acid resin could be obtained when the tetrahydrofuran was in a weight ratio with the NMP of 91/9. When the non-silylated p-phenylenediamine was employed, almost equal weight proportions of the NMP and tetrahydrofuran were required to obtain adequate solution of the reactants and formation of the polyamide acid resin to a resin solids of 13.8%.

EXAMPLE 13

In this example, when equimolar proportions of the silylated oxydianiline and PMDA were dissolved in a solution composed of acetonitrile and NMP, the weight ratio of the acetonitrile to the NMP for complete solubility was 74/26, whereas if the non-silylated oxydianiline was employed, the amount of NMP required with the acetonitrile was significantly greater, i.e. the ratio was 62/38 both at about 10.7% solids.

EXAMPLE 14

When equimolar concentrations of PMDA and the silylated oxydianiline were added to dioxane, it was found possible to dissolve the reactants and effect reaction between the reactants to obtain a homogeneous solution of the silylated polyamide acid resin when the dioxane and the NMP were in a weight ratio of 92.8/7.2, where the solids content of the polymer was 8.1 percent. On the other hand, when the non-silylated oxydianiline was employed instead of the silylated oxydianiline, but otherwise the conditions were the same, to obtain solution of the reactants and to obtain a homogeneous solution of the polymer to the same solids content, the weight ratio of dioxane to NMP dropped to 76/24.

EXAMPLE 15

In this example tetrahydropyrane was used as the solvent for equimolar proportions of PMDA and the silylated oxydianiline. To effect the necessary solubility for optimum attainment of homogeneous solution of the silylated polyamide acid resin, a small amount of NMP was required so that the weight ratio of the tetrahydropyrane to the NMP was 96.1/3.9. It is apparent that the tetrahydropyrane is almost as good a solvent as the tetrahydrofuran.

EXAMPLE 16

Samples of the silylated polyamide acid resin (Example 4) prepared from BPDA and the silylated oxydianiline using tetrahydrofuran as the solvent were cast as films, the solvent evaporated, and the films then heated at 200° C. for about 1 hour. The films which were originally clear became opaque and somewhat stiff. However, the films were mechanically strong and showed no crystallinity when examined by X-ray. A cross-section of such film viewed under the electron microscope showed that the opacity was apparently due to particles embedded in the matrix of the film. Thus, it became evident that a "self-filled" film had been prepared by this method, in which particles of polymer were present as filler in the matrix of the same polymer, but apparently in different physical states.

EXAMPLE 17

To 12.9 parts of BPDA and 13.7 parts of the silylated methylene dianiline was added 106.9 parts tetrahydrofuran. The reactants went into solution readily and after about 2 hours stirring at room temperature, a homogeneous viscous polymer solution (in which the polymer was composed of recurring units of the formula)

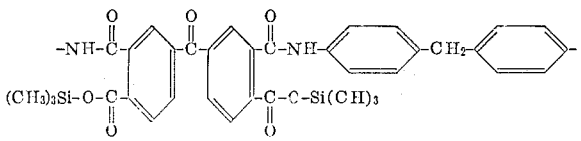

was obtained containing approximately 20 percent silylated polyamide acid solids on a weight basis. When an attempt was made to dissolve the non-silylated methylene dianiline with the BPDA in tetrahydrofuran, it was found that the reactants were insoluble and no satisfactory soluble resinous reaction product could be obtained under these conditions.

EXAMPLE 18

To show the effect of using a non-silylated methylene dianiline, 15.8 parts BPDA and 9.7 parts non-silylated methylene dianiline were mixed with 92.1 parts NMP and 32 parts tetrahydrofuran. After about 3 hours stirring, a viscous completely homogeneous polyamide acid resin solution was obtained. Tetrahydrofuran was then added portion-wise with stirring until a haze point was reached indicating incipient precipitation (that is lack of solubility) of the polyamide acid resin. A drop of NMP was then added to give a clear, completely homogeneous solution. The mixed solids at this point contained 100.1 parts NMP and 197.4 parts tetrahydrofuran giving a weight ratio of NMP to tetrahydrofuran of 33.6/66.4 while the polymer concentration was 7.9 percent solids. This example, when compared with Example 17, illustrates clearly that by using a silylated diamine, not only can one use lower boiling and less expensive solvents (such as tetrahydrofuran), but also products of higher solids content are obtainable.

EXAMPLE 19

This example illustrates the ability to use larger amounts of mixtures of alkylated aromatic compounds with higher boiling solvents described in the aforesaid British and Australian patents, as the result of employing a silylated diamine. The mixture of alkylated aromatics employed was Solvesso® 100, manufactured and sold by Humble Oil and Refining Company, which is a cut of aromatic compositions boiling between 159°–172° C., and consisted of the following:

| Constituent.[1] | Weight percent [2] |
|---|---|
| $C_8$ aromatics | 3.4 |
| $C_9$ aromatics | 78.8 |
| $C_{10}$ aromatics | 13.5 |
| $C_{11}$ aromatics | 0.5 |
| Indans | 1.8 |
| Total | 98.0 |

[1] Mostly methyl and ethyl-substituted benzenes.
[2] Balance higher boiling aromatics.

More particularly, employing the procedure in Example 1, 8.51 parts PMDA, 4.07 parts non-silylated oxydianiline, and 6.62 parts of the silylated oxydianiline, were mixed together and combined with 46.72 parts of the Solvesso 100 and 30.53 parts NMP. After stirring for about 2 hours, a viscous mass of a partially insoluble polymer was obtained. Thereafter, NMP was added in small increments until the solution became clear and all the polymer was dissolved; then additional amounts of Solvesso 100 were added to precipitate the polymer again; and finally an additional amount of NMP was added by increments until the polymer again dissolved and the solution was clear. In this manner, a series of solubility limits were obtained at a series of polymer solids concentrations as the amount of total solvent increased. Accompanying FIG. 1 is a graph of the various incremental additions of the solvents illustrating the solubility limits attainable by using the silylated oxydianiline in place of the non-silylated oxydianiline. The solid circles in the graph indicated incipient insolubility of the polymer, while the open circles indicate a complete solubility of the polymer in the solvent system. The lines draw between the points then indicated solubility limits. FIG. 1 shows that where a 50/50 molar ratio of the silylated and non-silylated oxydianiline is used with the PMDA, larger amounts of Solvesso 100 can be used with the NMP. Where the non-silylated oxydianiline was used alone with the PMDA, lesser amounts of Solvesso 100 could be tolerated to give clear, homogeneous solutions.

It will be apparent that in addition to using a disilylated diamine, one can also use a monosilylated diamine having the formula $H_2N—R'—NH—SiZ_3$ with the disilylated diamine, where R' and Z have the meanings above. Under such circumstances, the silylated polyamide acid resin will contain some carboxyls without silyl substituents thereon as a result of the interaction of the partially, i.e., the half-silylated diamino compound. Alternatively, one can employ mixtures of fully silylated and non-silylated diamino compounds whereby advantage is taken of the increased solubility ascribed to the presence of the silylated diamine. In such instances where both a silylated diamine and a non-silylated diamine are employed with the dianhydride, it will be apparent that there will be present recurring units of the formula

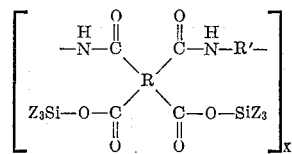

and the units of the formula

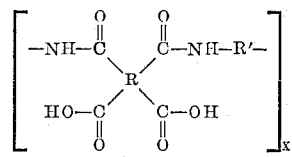

where x, Z, R and R' have the meanings given above. It is generally preferred that at least 75% of the units be of the fully silylated amine type for optimum solubility in solvents either normally non-solvents or poor solvents for one or both of the reactants composed of the non-silylated diamine and the dianhydride or for the polyamide acid resin, or for mixtures of poor and good solvents for the reactants of the non-silylated diamine type and the dianhydride and for the polyamide acid resin where the advantage is desired of using a less expensive, lower boiling solvent with the more expensive and more exotic type solvent, such as N-methylpyrrolidone.

In all the examples where a silylated polyamide acid resin was obtained, the latter could be heated at the required elevated temperatures to obtain a splitting off of the triorganosiloxy group as either the triorganosilanol or the hexaorganodisiloxane, with the concurrent formation of the polyimide resin.

Both the silylated polyamide acid resin and the polyimide resin formed therefrom have many uses. Solutions of these resins can be cast to form films which can be employed as slot liners in motors. Additionally, these films can be used in those cases where heat-resistant products are desired, such as in packaging operations, as protective coatings for various surfaces, etc. In addition, solutions of the polyamide acid resin can be applied to electrical conductors, for example, copper, aluminum, etc., and the coated conductor passed through a heated tower at temperatures of from 150° to 350° C. for times ranging from about 1 minute to 30 minutes, to effect formation of the polyimide resin and volatilization of both the solvent and the triorganosilanol. Finally, solutions of the silylated polyamide acid resin can be used to spin fibers either from spinnerettes into the dry air or into non-solvents for the silylated polyamide acid resin, and these fibers can be oriented and further treated at elevated temperatures to effect formation of the polyimide resin structure. If desired the fibers in the silylated polyamide resin form can be stretched and oriented, and then while in this state converted by heating to the polyimide form. In the polyimide resin form, these fibers have good heat resistance, and can be used for making heat resistant fabrics, filters, brake linings, etc. The polyimide polymers derived from the silylated polyamide acid resin display good resistance to various chemicals and because of the plurality of aromatic nuclei in the polyimide resin structure, show good resistance to irradiation by high energy particles and gamma rays. Exposure to elevated temperatures as high as 300 or 400° C. does not adversely affect the polyimide resin. Films or other forms of the silylated polyamide resin can be irradiated with high energy radiation, e.g., electrons, to give useful products, e.g., capacitor film.

Additional uses for the polyimide resins are, for instance, for making capacitors, for wrapping cables, corrosion resistant piping, etc. Laminates of these polyimide resin films can be made which possess good heat resistance and have desirable electrical properties at elevated temperatures.

What we claim as new and desire to secure by Letters Patent of the United States is:

1. A composition of matter composed of recurring units of the formula $$\left[ \begin{array}{c} -N(H)-C(=O) \quad C(=O)-N(H)-R'- \\ \phantom{xxx} R \\ Z_3Si-O-C(=O) \quad C(=O)-O-SiZ_3 \end{array} \right]_x$$

where Z is a monovalent hydrocarbon radical, R is a tetravalent radical containing at least 6 carbon atoms in a ring having benzenoid unsaturation, the four carbonyl groups being attached to separate carbon atoms of said tetravalent radical in the ring, and each pair of carbonyl groups being attached to adjacent carbon atoms in the R radical at most one carbon atom removed from each other, R' is a divalent aromatic radical of at least 6 carbon atoms, and $x$ is a whole number in excess of at least 10.

2. A composition of matter composed of recurring units of the formula $$\left[ -NH-C(=O)-C_6H_4-C(=O)-NH-C_6H_4-O-C_6H_4- \atop (CH_3)_3Si-O-C(=O) \quad C(=O)-O-Si(CH_3)_3 \right]_x$$

where $x$ is a whole number in excess of at least 10.

3. A composition of matter composed of recurring units of the formula $$\left[ -NH-C(=O)-C_6H_4-C(=O)-NH-C_6H_5 \atop (CH_3)_3Si-O-C(=O) \quad C(=O)-O-Si(CH_3)_3 \right]_x$$

where $x$ is a whole number in excess of at least 10.

4. A composition of matter composed of recurring units of the formula $$\left[ -NH-C(=O)-C_6H_4-C(=O)-C(=O)-N(H)-C_6H_4-O-C_6H_4- \atop (CH_3)_3SiO-C(=O) \quad C(=O)-OSi-(CH_3)_3 \right]_x$$

where $x$ is a value in excess of at least 10.

5. A composition of matter composed of recurring units of the formula $$\left[ -NH-C(=O)-C_6H_4-C(=O)-C(=O)-NH-C_6H_5 \atop (CH_3)_3SiO-C(=O) \quad C(=O)-OSi(CH_3)_3 \right]_x$$

where $x$ is a whole number in excess of at least 10.

6. A composition of matter composed of recurring units of the formula $$\left[ -NH-C(=O)-C_6H_4-C(=O)-C(=O)-NH-C_6H_5 \atop (CH_3)_3SiO-C(=O) \quad C(=O)-OSi(CH_3)_3 \right]_x$$

where $x$ is a whole number in excess of at least 10.

7. A composition of matter composed of recurring units of the formula $$\left[ -NH-C(=O)-C_6H_4-C(=O)-C(=O)-NH-C_6H_4-CH_2-C_6H_5 \atop (CH_3)_3SiO-C(=O) \quad C(=O)-OSi(CH_3)_3 \right]_x$$

where $x$ is a whole number in excess of at least 10.

8. A homogeneous solution composed essentially of a silylated polyamide acid resin of the formula $$\left[ \begin{array}{c} -N(H)-C(=O) \quad C(=O)-N(H)-R'- \\ \phantom{xxx} R \\ Z_3Si-O-C(=O) \quad C(=O)-O-SiZ_3 \end{array} \right]_x$$

where Z is a monovalent hydrocarbon radical R is a tetravalent radical containing at least 6 carbon atoms in the ring having benzenoid unsaturation, the four carbonyl groups being attached to separate carbon atoms of said tetravalent radical in the ring and each pair of carbonyl groups being attached to adjacent carbon atoms in the R radical at most one carbon atom removed from each other, R' is a divalent aromatic radical of at least 6 carbon atoms, and $x$ is a whole number in excess of at least 10, and (2) a solvent for (1).

9. A solution as in claim 8 in which the solvent is tetrahydrofuran.

10. A solution as in claim 8 in which the solvent is a mixture of N-methylpyrrolidone and toluene.

11. A solution as in claim 8 in which the solvent is a mixture of tetrahydrofuran and N-methylpyrrolidone.

12. A solution as in claim 8 in which the solvent is a mixture of tetrahydropyrane and N-methylpyrrolidone.

13. A solution as in claim 8 in which the solvent is a mixture of alkylated benzenes and N-methylpyrrolidone.

14. A solution as in claim 8 in which the solvent is a mixture of dioxane and N-methylpyrrolidone.

15. The process for making a polyimide resin of the formula $$\left[ \begin{array}{c} -N \quad R \quad N-R'- \\ C(=O) \quad C(=O) \\ C(=O) \quad C(=O) \end{array} \right]_x$$

which process comprises (1) making a silylated polyamide acid resin by effecting reaction, in a solvent for at least one of the reactants and for the silylated polyamide acid resin thereby obtained, of a mixture of ingredients comprising a silylated diamine of the formula

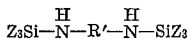

and at least one tetracarboxylic acid dianhydride having the structural formula

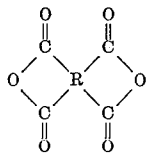

where Z is a monovalent hydrocarbon radical, R is a tetravalent radical containing at least 6 carbon atoms in a ring having benzenoid unsaturation, the four carbonyl groups of said dianhydride being attached to separate carbon atoms of said tetravalent radical in the ring, and each pair of carbonyl groups being attached to adjacent carbon atoms in the R radical at most one carbon atom removed from each other, and R' is a divalent aromatic radical of at least 6 carbon atoms, thereby to obtain a polyamide acid resin composed of recurring units of the formula

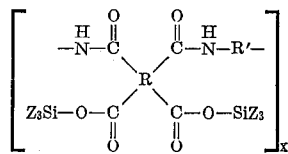

where Z, R and R' have the meanings given above, and $x$ is a whole number of at least 10, and (2) thereafter heating the silylated polyamide acid resin to form the above-mentioned polyimide resin.

References Cited by the Examiner
UNITED STATES PATENTS 3,179,614 4/1965 Edwards _____ 260—30.4
3,207,707 9/1965 Klebe _____ 260—448.2

MORRIS LIEBMAN, *Primary Examiner.*

B. A. AMERNICK, *Assistant Examiner.*